(12) United States Patent
Maeda

(10) Patent No.: US 8,571,382 B2
(45) Date of Patent: Oct. 29, 2013

(54) RECORDING AND REPRODUCING APPARATUS, RECORDING APPARATUS, AND SYSTEM INCLUDING THEM

(75) Inventor: Masamine Maeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1685 days.

(21) Appl. No.: 11/633,451

(22) Filed: Dec. 5, 2006

(65) Prior Publication Data

US 2007/0126879 A1   Jun. 7, 2007

(30) Foreign Application Priority Data

Dec. 6, 2005   (JP) .................................. 2005-352328

(51) Int. Cl.
*H04N 5/76* (2006.01)
*H04N 9/80* (2006.01)

(52) U.S. Cl.
USPC .......................................... 386/239; 386/248

(58) Field of Classification Search
None
See application file for complete search history.

(56) References Cited

U.S. PATENT DOCUMENTS

| | | | | |
|---|---|---|---|---|
| 5,522,037 A | * | 5/1996 | Kitagawa et al. | 714/40 |
| 5,829,044 A | * | 10/1998 | Sono | 711/156 |
| 5,974,220 A | * | 10/1999 | Kajimoto | 386/278 |
| 6,009,228 A | * | 12/1999 | Fujita et al. | 386/281 |
| 6,020,982 A | * | 2/2000 | Yamauchi et al. | 358/444 |
| 6,038,368 A | * | 3/2000 | Boetje et al. | 386/278 |
| 6,088,312 A | * | 7/2000 | Utsumi | 369/47.11 |
| 6,236,802 B1 | * | 5/2001 | Yamamoto | 386/282 |
| 6,462,753 B1 | * | 10/2002 | Koyata et al. | 715/716 |
| 6,600,868 B2 | * | 7/2003 | Tokashiki | 386/230 |
| 6,661,965 B2 | * | 12/2003 | Yamamoto | 386/279 |
| 7,123,813 B2 | * | 10/2006 | Inoue | 386/248 |
| 2002/0018644 A1 | * | 2/2002 | Isobe et al. | 386/95 |
| 2004/0225863 A1 | * | 11/2004 | Yamashita | 712/1 |
| 2005/0007895 A1 | * | 1/2005 | Iijima et al. | 369/30.05 |
| 2007/0172212 A1 | * | 7/2007 | Miyagawa | 386/125 |

FOREIGN PATENT DOCUMENTS

JP   2003-257021   9/2003

* cited by examiner

Primary Examiner — Gelek W Topgyal
(74) Attorney, Agent, or Firm — Fitzpatrick, Cella, Harper & Scinto

(57) ABSTRACT

A recording and reproducing apparatus comprises a reproducing unit adapted to reproduce data recorded in a first recording medium, a storage unit adapted to store data recorded in the first recording medium, a recording unit adapted to record the data stored in the storage unit on a second recording medium, a discrimination unit adapted to discriminate based on management information required to manage data recorded in a plurality of the first recording media as one group whether or not all data of the group are stored in the storage unit and a control unit adapted to control, when all the data of the group are stored in the storage unit, to read out all the data of the group from the storage unit and to record the readout data on the second recording medium.

5 Claims, 8 Drawing Sheets

FIG. 4

401 { <item1>
    disc=1
    title=1

402 { <item2>
    disc=2
    title=2

403 { <item3V
    disc=2
    title=3

404 { <item4>
    disc=3
    title=4

405 { <item5>
    disc=3
    title=5

406 { <item6>
    disc=4
    title=6

407 { <item7>
    disc=4
    title=7

RECORDING AND REPRODUCING APPARATUS, RECORDING APPARATUS, AND SYSTEM INCLUDING THEM

BACKGROUND OF THE INVENTION

1. Field of the Invention

The present invention relates to a recording and reproducing technique of data recorded on a recording medium such as an optical disc, memory card, or the like.

2. Description of the Related Art

Various video cameras which use large-capacity recording media such as optical discs, memory cards, and the like are commercially available. As a recording medium, for example, a DVD (Digital Versatile Disc) is known. A recordable DVD such as a DVD-R, DVD-RW, or the like has a capacity of 4.7 Gbytes. The DVD-Video adopts MPEG2 as a moving image compression encoding processing technique. By compressing an image signal by MPEG2, one DVD can record video data having an image quality as high as the conventional S-VHS for about two hours. DVD recorders which record and reproduce TV broadcast programs and the like on the DVD have rapidly prevailed in recent years.

On the other hand, portable video cameras using the DVD as a recording medium are also available. This video camera adopts 8-cm DVD media which have compatibility to 12-cm DVD media, and have a capacity of 1.4 Gbytes in place of the aforementioned conventional 12-cm DVD media having a capacity of 4.7 Gbytes. In this manner, high portability equivalent to the conventional DV video cameras is realized (for example, see Japanese Patent Laid-Open No. 2003-257021).

Since the 8-cm DVD medium has a capacity as small as 1.4 Gbytes, as described above, it can record only data for about 30 minutes under the recording condition of 6 Mbits/sec as a general recording rate. When the recording rate is set to be, e.g., 3 Mbits/sec to attain long-time recording, each disc can record data for one hour, but the image quality deteriorates considerably. When the recording rate is set to be, e.g., 9 Mbits/sec to record video data with high image quality, one disc can only record data for 20 minutes. In this manner, in either case, if the user wants to record video and audio data for several hours while traveling, he or she must use a plurality of media.

On the other hand, 12-cm DVD media are currently generally distributed rather than 8-cm DVD media due to prevalence of the aforementioned DVD recorders. In such situation, a use method of dubbing and storing the contents recorded on a plurality of 8-cm DVD media on a 12-cm DVD medium may become mainstream.

However, when the user records the contents using a plurality of 8-cm media described above by a video camera, and attempts to dub the contents on the aforementioned 12-cm medium, such contents often become very hard to record on the medium within its capacity. Hence, an edit operation is required to collect required contents in consideration of the recordable capacity of the 12-cm medium. However, this edit operation is very time-consuming. Especially, when the original video data are recorded across a plurality of media, the user must manually calculate the total time by noting down respective recording times on a memo pad or the like, resulting in very troublesome operations.

SUMMARY OF THE INVENTION

The present invention has been made in consideration of the above problems, and has as its object to provide a technique which allows the user to record data recorded on a plurality of recording media on a recording medium by a simple operation.

In order to achieve the above object, according to the present invention, there is provided a recording and reproducing apparatus comprising: a reproducing unit adapted to reproduce data recorded in a first recording medium; a storage unit adapted to store data recorded in the first recording medium; a recording unit adapted to record the data stored in the storage unit on a second recording medium; a discrimination unit adapted to discriminate based on management information required to manage data recorded in a plurality of the first recording media as one group whether or not all data of the group are stored in the storage unit; and a control unit adapted to control, according to a discrimination by the discrimination unit that all the data of the group are stored in the storage unit, to read out all the data of the group from the storage unit and to record the readout data on the second recording medium.

There is also provided a recording apparatus comprising: an input unit adapted to input data; a recording unit adapted to record the data on a first recording medium; a management information generation unit adapted to generate management information required to manage data recorded on a plurality of the first recording media as one group having a predetermined data size as a unit; and a display unit adapted to display a difference between the predetermined data size and a total data size of the group.

There is also provided a system which comprises a recording apparatus for recording data on a first recording medium, and a recording and reproducing apparatus for recording the data recorded on the first recording medium onto a second recording medium, the recording apparatus comprising: an input unit adapted to input data; a first recording unit adapted to record the data on the first recording medium; a management information generation unit adapted to generate management information required to manage data recorded on a plurality of the first recording media as one group having a predetermined data size as a unit; and a display unit adapted to display a difference between the predetermined data size and a total data size of the group, and the recording and reproducing apparatus comprising: a reproducing unit adapted to reproduce data recorded in the first recording medium; a storage unit adapted to store data recorded in the first recording medium; a second recording unit adapted to record the data stored in the storage unit on a second recording medium; a discrimination unit adapted to discriminate based on management information required to manage data recorded in a plurality of the first recording media as one group whether or not all data of the group are stored in the storage unit; and a control unit adapted to control, when all the data of the group are stored in the storage unit, to read out all the data of the group from the storage unit and to record the readout data on the second recording medium.

There is also provided a data recording method for a recording and reproducing apparatus, which comprises a reproducing unit adapted to reproduce data recorded in a first recording medium, and a storage unit adapted to store data recorded in the first recording medium, comprising: a recording step of recording the data stored in the storage unit on a second recording medium; a discrimination step of discriminating based on management information required to manage data recorded in a plurality of the first recording media as one group whether or not all data of the group are stored in the storage unit; and a control step of controlling, when all the data of the group are stored in the storage unit, to read out all the data of the group from the storage unit and to record the readout data on the second recording medium.

There is also provided a data input method for a recording apparatus, which comprises an input unit adapted to input data, and a recording unit adapted to record the data on a first recording medium, comprising: a management information generation step of generating management information required to manage data recorded on a plurality of the first recording media as one group having a predetermined data size as a unit; and a step of displaying a difference between the predetermined data size and a total data size of the group.

There is also provided a control method of a system, which comprises a recording apparatus that comprises an input unit adapted to input data, and a first recording unit adapted to record the data on a first recording medium, and a recording and reproducing apparatus that comprises a reproducing unit adapted to reproduce data recorded in a first recording medium, and a storage unit adapted to store data recorded in the first recording medium, the recording apparatus comprising: a management information generation step of generating management information required to manage data recorded on a plurality of the first recording media as one group having a predetermined data size as a unit; and a display step of displaying a difference between the predetermined data size and a total data size of the group, and the recording and reproducing apparatus comprising: a recording step of recording the data stored in the storage unit on a second recording medium; a discrimination step of discriminating based on management information used to manage data recorded in a plurality of the first recording media as one group whether or not all data of the group are stored in the storage unit; and a control step of controlling, when all the data of the group are stored in the storage unit, to read out all the data of the group from the storage unit and to record the readout data on the second recording medium.

According to the present invention, contents recoded by a video camera or the like, in a plurality of recording media, can be saved on a recording medium by a simple operation without omission of the contents or any troublesome edit operation or the like.

Further features of the present invention will become apparent from the following description of exemplary embodiments with reference to the attached drawings.

BRIEF DESCRIPTION OF THE DRAWINGS

FIG. 4 shows a description example of a playlist file according to the embodiment of the present invention;

DESCRIPTION OF THE EMBODIMENTS

Preferred embodiments of the present invention will be described in detail hereinafter with reference to the accompanying drawings.

Note that embodiments to be described hereinafter are examples upon implementing the present invention and should be appropriately modified or changed depending on the arrangements or various conditions of apparatuses to which the present invention is applied, and the present invention is not limited to the following embodiments.

First Embodiment

A recording and reproducing system according to the first embodiment of the present invention will be described below.

A recording and reproducing system of this embodiment comprises a digital video camera and a stationary type video deck to be described below.

Figure 1:
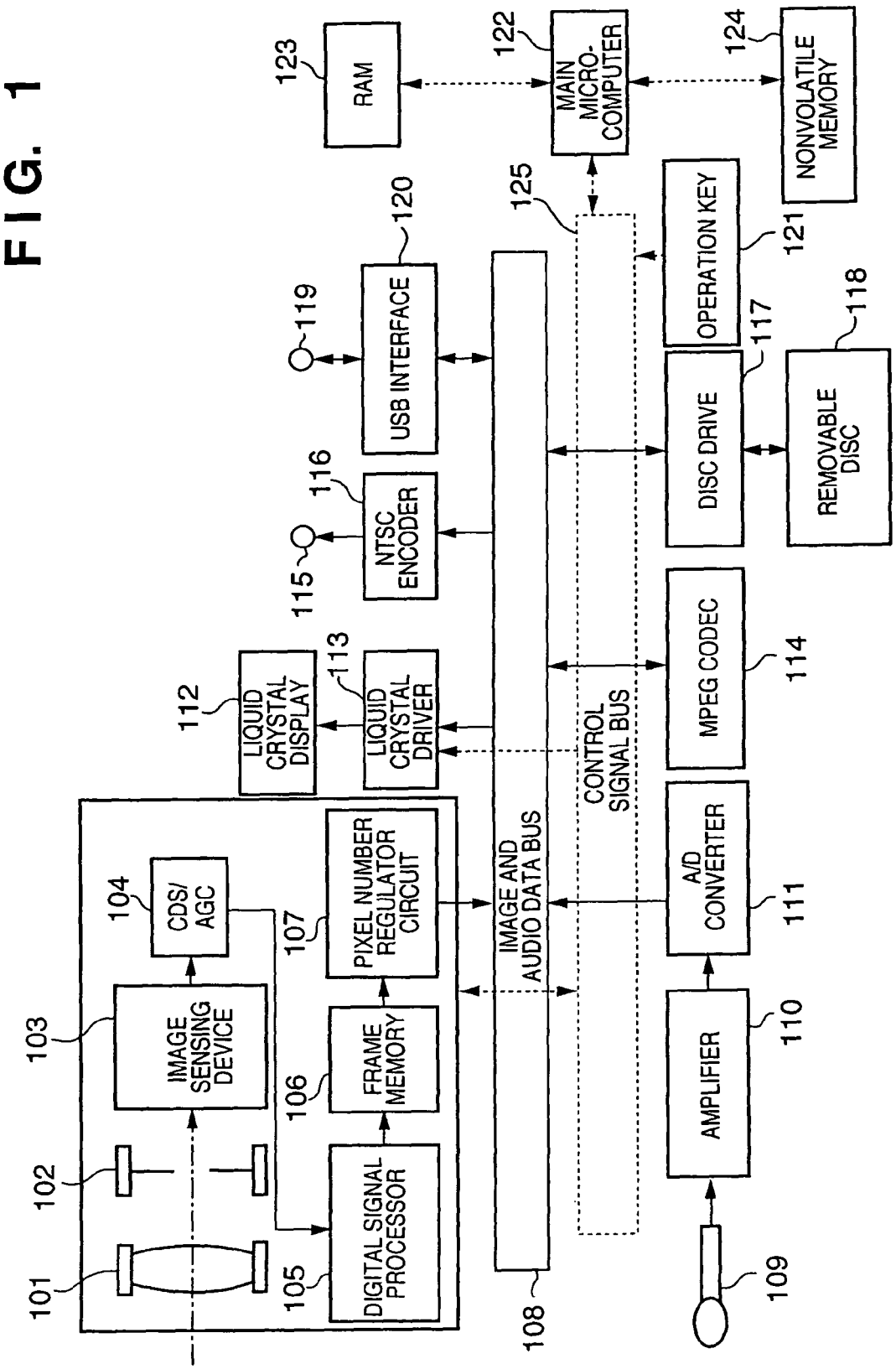
FIG. 1 is a block diagram of a digital video camera according one embodiment of the present invention.

FIG. 1 is a block diagram of the digital video camera of this embodiment.

Referring to FIG. 1, reference numeral 101 denotes a photographing lens used to capture an object image. Reference numeral 102 denotes a stop (aperture) which controls the amount of light to an image sensing device to be described below. Reference numeral 103 denotes an image sensing device which converts the captured object image into an image signal. Reference numeral 104 denotes a CDS (Correlated Double Sampling)/AGC (Auto Gain Controller). Reference numeral 105 denotes a digital signal processor which A/D-converts the image signal from the CDS/AGC, and applies digital signal processing to the converted signal.

Reference numeral 106 denotes a frame memory which stores raw data from the digital signal processor 105 frame by frame. Reference numeral 107 denotes a pixel number regulator circuit which regulates a pixel number to an appropriate value so as to record pixel data on the frame memory by MPEG2 or MPEG4 (to be described later). These components from the photographing lens 101 to the pixel number regulator circuit 107 form an image sensing unit. Reference numeral 108 denotes an image and audio data bus used to exchange image data and audio data (to be described later) among blocks.

Reference numeral 109 denotes a microphone which collects audio data to be recorded on a removable disc (to be described later) together with the image data. Reference numeral 110 denotes an amplifier which amplifies an audio signal from the microphone 109 to an appropriate level. Reference numeral 111 denotes an A/D converter which converts the amplified analog audio signal into a digital signal. Reference numeral 112 denotes a liquid crystal display which displays reproduced image data from an MPEG2 codec 114 (to be described later) in a reproducing mode, and a video picture recorded by the image sensing device 103 in a recording mode.

Reference numeral 113 denotes a liquid crystal driver which drives the liquid crystal display 112. Reference numeral 114 denotes an MPEG2 codec which encodes a digital moving image signal supplied from the image and audio data bus 108 according to MPEG2 to compress its information size, and decodes the encoded moving image signal to decompress the information size. Reference numeral 115 denotes a video output terminal which outputs an analog video signal from an NTSC encoder (to be described below). Reference numeral 116 denotes an NTSC encoder which converts the same image as that to be displayed on the liquid crystal display 112 into an analog signal, and outputs the converted analog signal to the video output terminal 115.

Reference numeral 117 denotes a disc drive which makes data read and write accesses to a removable disc 118 (to be described below). Reference numeral 118 denotes a removable disc such as a DVD or the like, which records MPEG2 image data from the image and audio data bus 108. Reference numeral 119 denotes a USB terminal which outputs data from a USB interface 120 (to be described below). Reference numeral 120 denotes a USB interface which externally outputs MPEG2 image data recorded on the removable disc 118 intact. Reference numeral 121 denotes operation keys used by the user to make operations to a camera main body. Reference numeral 122 denotes a main microcomputer which controls the operation mode of the entire camera, and controls execution of various functions by detecting operations of the operation keys 121. Reference numeral 123 denotes a RAM in which the main microcomputer 122 temporarily stores data. Reference numeral 124 denotes an EEPROM as a nonvolatile memory which stores a predetermined state of the main microcomputer 122. Reference numeral 125 denotes a control signal bus which exchanges control signals from the main microcomputer 122 and signals from the operation keys 121.

Figure 2:
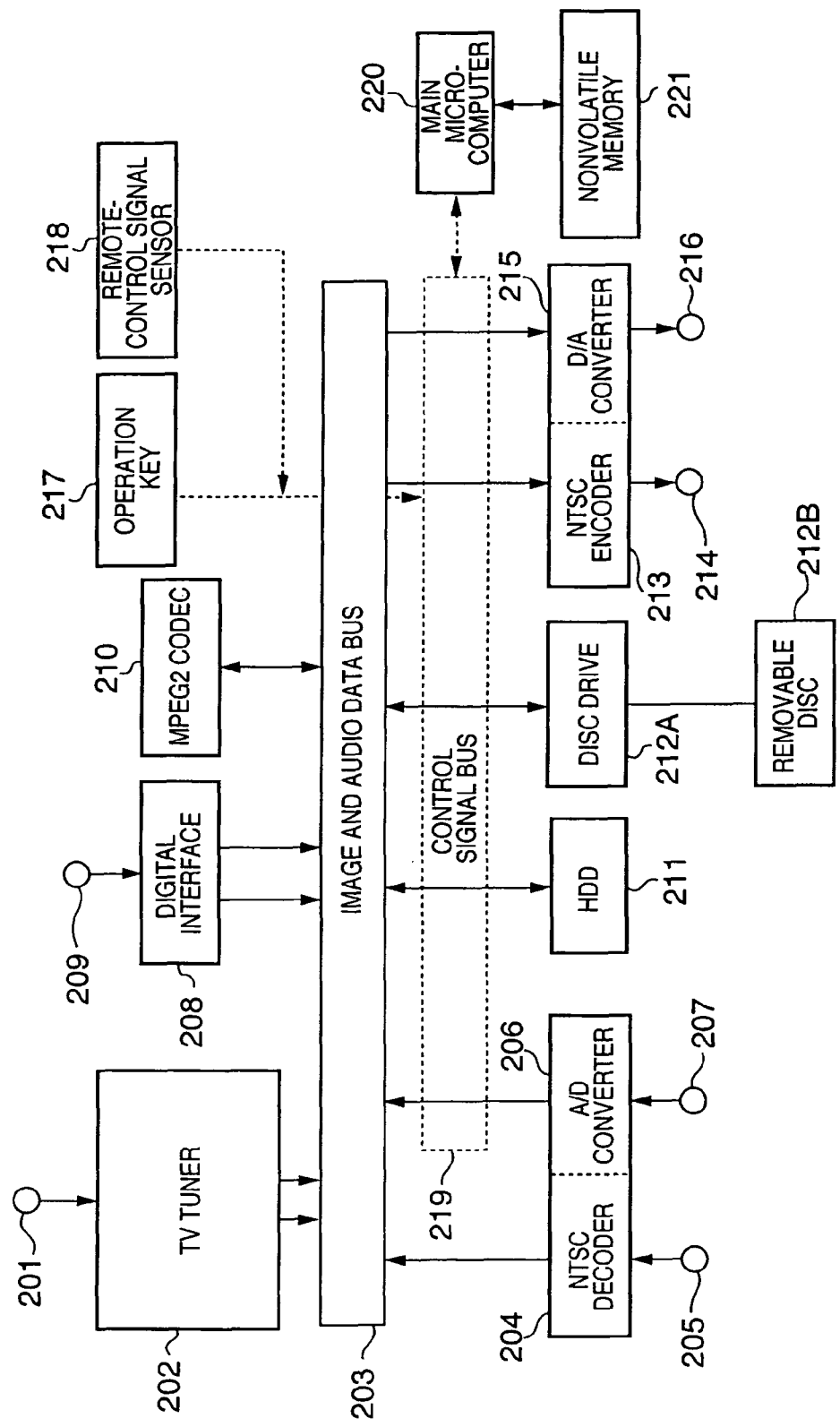
FIG. 2 is a block diagram of a stationary type video deck according one embodiment of the present invention.

FIG. 2 is a block diagram of the stationary type video deck of this embodiment.

Referring to FIG. 2, reference numeral 202 denotes a TV tuner, which extracts video and audio signals by tuning and detecting an RF input such as a BS, terrestrial wave, and the like input from an antenna input terminal 201, converts the extracted signals into digital signals, and outputs image and audio data onto an image and audio data bus 203 (to be described below). Reference numeral 203 denotes an image and audio data bus which exchanges image data and audio data (to be described later) among respective blocks. Reference numeral 204 denotes an NTSC decoder which converts an analog NTSC signal from a video input terminal 205 (to be described below) into a digital signal, and outputs image data onto the image and audio data bus 203.

Reference numeral 205 denotes a video input terminal which connects an analog output of an external video apparatus. Reference numeral 206 denotes an A/D converter which converts an analog audio signal from an audio input terminal 207 (to be described below) into a digital signal and outputs the digital audio signal onto the image and audio data bus 203. Reference numeral 207 denotes an audio input terminal which is connected to an analog audio output terminal of the external video apparatus or an external audio apparatus. Reference numeral 208 denotes a digital interface which converts the digital image signal and digital audio signal input from a digital input terminal 209 into a format suited to the image and audio data bus 203 and outputs the converted signals.

Reference numeral 210 denotes an MPEG2 codec which encodes the digital image signal and digital audio signal supplied from the image and audio data bus 203 according to MPEG2 to compress their information sizes, and decodes MPEG2 encoded data recorded in an HDD 211, removable disc 212, and the like (to be described below) to decompress their information sizes. Reference numeral 211 denotes a hard disc drive (HDD) which incorporates a large-capacity hard disc that records the MPEG2 data, and makes read and write accesses to the hard disc. Reference numeral 212A denotes a disc drive which makes data read and write accesses to a removable disc 212B (to be described below). Reference numeral 212B denotes a removable disc which is removable, and records the MPEG2 data.

Reference numeral 213 denotes an NTSC encoder which converts the digital image signal from the image and audio data bus 203 into an analog signal, and outputs the analog image signal to a video output terminal 214. Reference numeral 215 denotes a D/A converter which converts the digital audio signal from the image and audio data bus 203 into an analog audio signal, and outputs the analog audio signal to an audio output terminal 216. Reference numeral 217 denotes operation keys used to operate the video deck main body. Reference numeral 218 denotes a remote-control signal sensor which receives a transmission signal from a remote controller upon making a remote controller operation. Reference numeral 219 denotes a control signal bus which exchanges control signals from a main microcomputer 220 (to be described below) and control signals from the operation keys 217 and the like. Reference numeral 220 denotes a main microcomputer which controls the overall operation mode of the video deck, and controls execution of various functions by reading the operations of the operation keys 217. Reference numeral 221 denotes an EEPROM as a nonvolatile memory, which stores settings of the main microcomputer 220 and various data collected by the main microcomputer 220.

The operation on the digital video camera side with the above arrangement will be described below.

Figure 3:
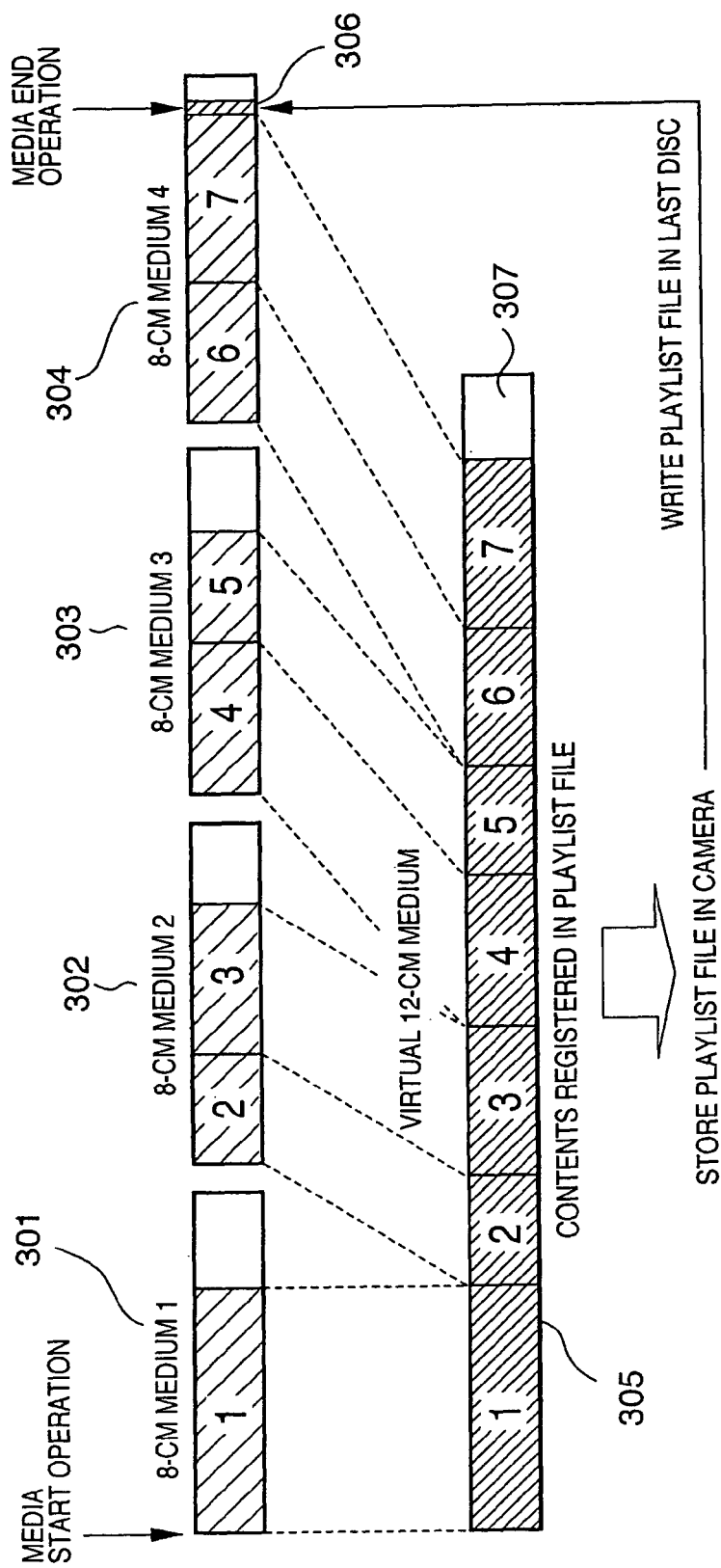
FIG. 3 is a chart for exemplifying the operation of the digital video camera and recording on media according to the embodiment of the present invention.

FIG. 3 shows an example of video recording of contents recorded by the system of this embodiment using four 8-cm DVD media in a 12-cm DVD medium. Note that numbers in FIG. 3 represent respective contents. An 8-cm DVD medium has a capacity of about 1.4 Gbytes, and a 12-cm DVD medium has a capacity of about 4.7 Gbytes.

Upon starting photographing on a first 8-cm DVD medium 301 by the digital video camera, the user makes a media start operation using the operation keys 121. In response to this operation, the main microcomputer 122 begins to generate a playlist 305 on the RAM 123, and registers a disc number (ID) and recorded content in the playlist every time photographing ends. When the user records up to content 7 of a fourth 8-cm DVD medium 304 in this manner, and makes a media end operation, the main microcomputer 122 records a playlist file 306, which registers contents 1 to 7, on the fourth 8-cm DVD medium 304, as shown in FIG. 3. Note that the playlist need not always be recorded on the fourth 8-cm DVD medium 304 but need only be recorded on one of the DVD media 301 to 304. More specifically, for example, after execution of the media end operation, when the user loads one of the discs 301 to 303 into the video camera, the main microcomputer 122 reads out the playlist 305 stored in the RAM 123, and records it on a free area of the disc.

In this way, according to this embodiment, contents 1 to 7 photographed between the media start operation and the media end operation and the discs 301 to 304 are managed as one media group.

FIG. 4 shows a description example of the playlist file.

Referring to FIG. 4, reference numeral 401 denotes content 1 on the first 8-cm DVD medium 301. Reference numerals 402 and 403 denote contents 2 and 3 on the second 8-cm DVD medium 302. Reference numerals 404 and 405 denote contents 4 and 5 on the third 8-cm DVD medium 303. Reference numerals 406 and 407 denote contents 6 and 7 on the fourth 8-cm DVD medium 304. These contents 1 to 7 are registered so as to be reproduced in the order named.

The main microcomputer 122 determines the content to be registered in one playlist 306 based on 4.7 Gbytes as the capacity of the 12-cm DVD media. That is, the main microcomputer 122 creates the playlist 306 so that the total capacity of original contents registered in one playlist 306 falls within 4.7 Gbytes. During photographing, the main microcomputer 122 displays the remaining capacity in one media group, i.e., the recordable remaining capacity with respect to 4.7 Gbytes on the liquid crystal display 112 in addition to the remaining capacity of the 8-cm DVD medium loaded into the camera, as described above.

After media start, the capacity of the contents registered in one media group may exceed 4.7 Gbytes since the user does not make any media end operation.

That is, the main microcomputer 122 detects whether or not the total of the combined capacity of the contents which have already been registered in the current media group and the capacity of the content which is now on camera exceeds 4.7 Gbytes.

If the total capacity exceeds 4.7 Gbytes, the main microcomputer 122 manages the contents immediately before the content now on camera as one media group. That is, the main microcomputer 122 does not register the content now on camera in the current playlist, and generates and registers it in a new playlist to manage that content as a new media group.

Upon generation of the new playlist, the main microcomputer 122 records the current playlist on the disc. After that, photographed contents are registered in this new playlist until the user makes the media end operation.

In this case, the main microcomputer 122 may display a message indicating that a new media group starts on the liquid crystal display 112 to inform the user of that fact.

When the total capacity of the contents registered in the playlist and that now on camera exceeds 4.7 Gbytes, a file of the content now on camera may be divided immediately before 4.7 Gbytes are exceeded. In this case, the main microcomputer 122 manages the contents up to the former half file of the divided content files as one media group.

Furthermore, when the user exchanges the recorded 8-cm DVD medium by an unrecorded 8-cm DVD medium after the media end operation, and starts video recording, a media start operation may be made automatically.

The operation of the stationary type video deck will be described below.

The stationary type video deck of this embodiment temporarily stores the contents of an 8-cm DVD medium in the hard disc of the HDD 211 (to be simply referred to as HDD 211 hereinafter), and then dubs the contents stored in the HDD 211 onto a DVD-R medium loaded into the removable disc drive 212A. The hard disc 211 has a recording capacity of several hundred Gbytes, and can store data recorded on a plurality of 8-cm DVD media. MPEG2 data can be directly copied from the DVD medium to the hard disc 211 in the form of file transfer without being decompressed and re-compressed. For this reason, dubbing can be completed within a short period of time, and deterioration of image quality resulting from dubbing can be prevented.

Figure 5:
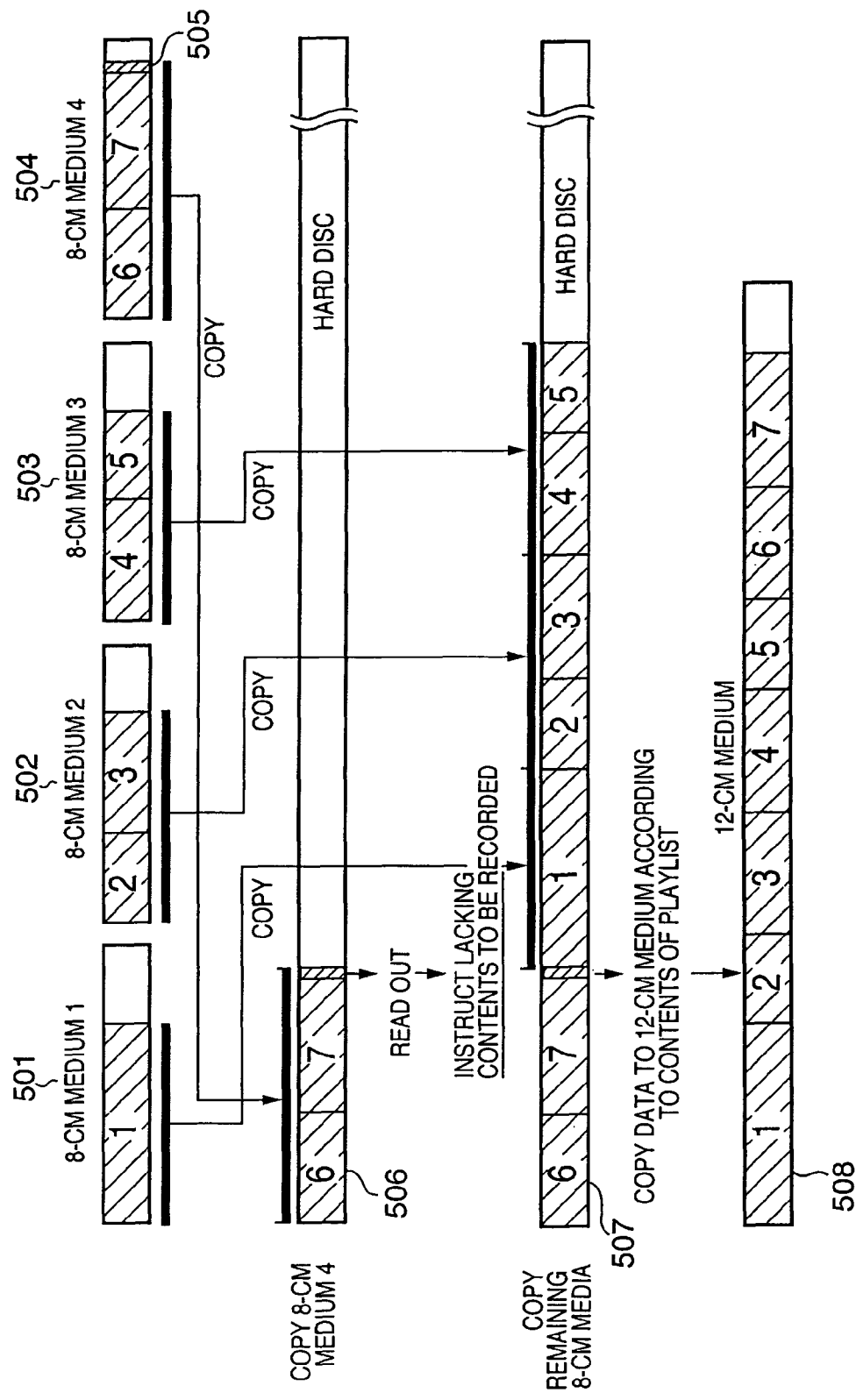
FIG. 5 is a chart for exemplifying the operation of the stationary type video deck and recording on media according to the embodiment of the present invention.

FIG. 5 shows the sequence for generating a 12-cm DVD medium which stores the contents of the 8-cm DVD media recorded by the digital video camera of this embodiment.

Referring to FIG. 5, reference numerals 501 to 504 respectively denote the first 8-cm DVD medium. 301, second 8-cm DVD medium 302, third 8-cm DVD medium 303, and fourth 8-cm DVD medium 304 shown in FIG. 3.

Figure 8:
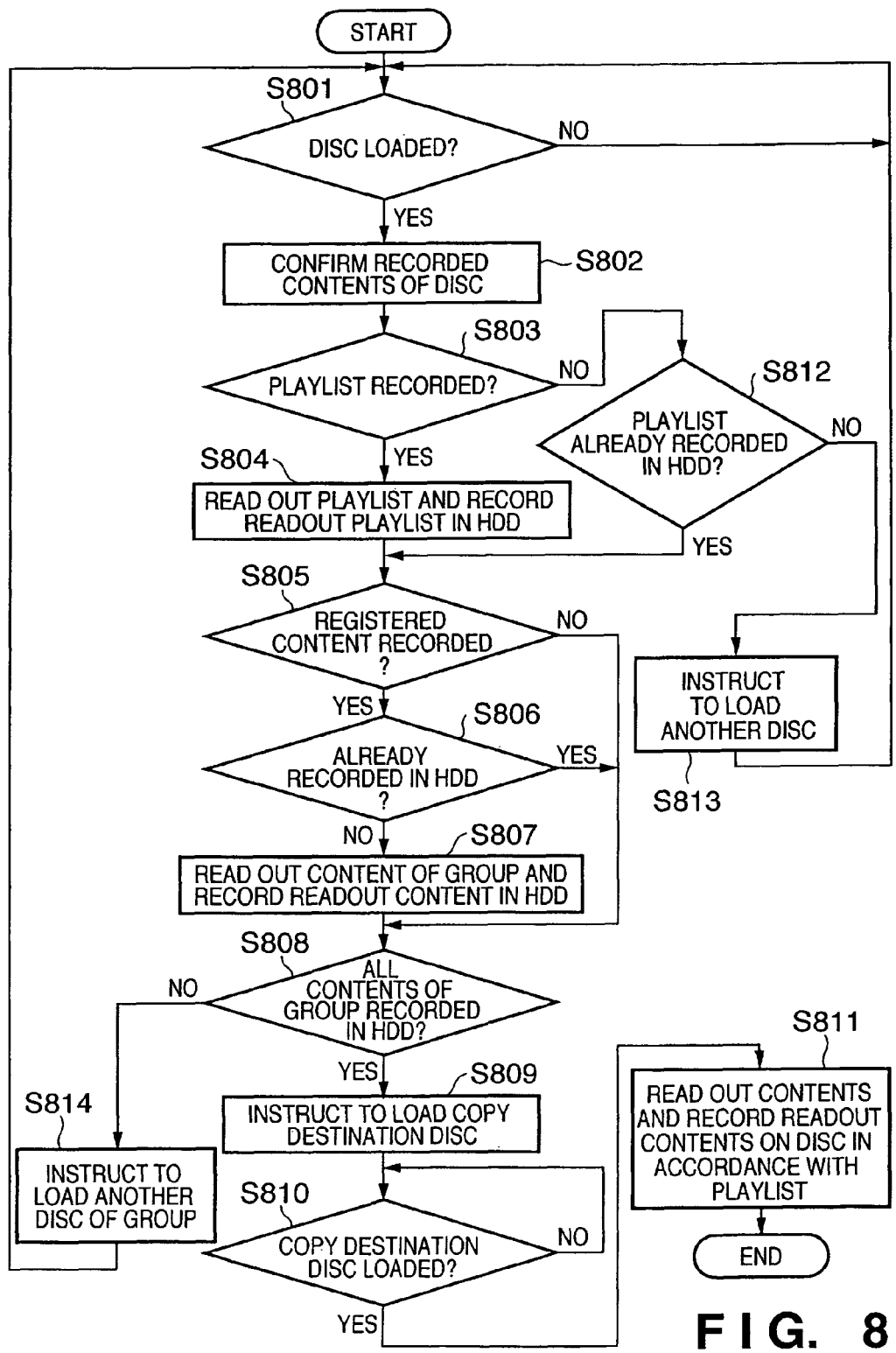
FIG. 8 is a flowchart showing dubbing processing in the video deck shown in FIG. 2.

FIG. 8 is a flowchart showing the dubbing processing in the video deck shown in FIG. 2. Note that the main microcomputer 220 mainly executes the procedure shown in FIG. 8. During the processing of FIG. 8, the user can cancel dubbing processing any-time he or she wants by instructing to cancel processing using the operation keys 217.

When the user instructs a dubbing mode using the operation keys 217, the procedure shown in FIG. 8 starts.

With the above arrangement, if the user loads one of the four 8-cm DVD media 501 to 504 into the removable disc drive 212A (S801), the main microcomputer 220 confirms the contents of data recorded on the disc based on the management information of the loaded DVD medium (S802). The main microcomputer 220 discriminates if a playlist used to manage a media group is recorded on this disc (S803). If the playlist is recorded, the main microcomputer 220 reads out this playlist, and records it in the HDD 211 (S804).

On the other hand, if a playlist is not recorded, the main microcomputer 220 discriminates if a playlist has already been recorded in the HDD 211 (S812). For example, when the disc 504 is loaded to record the playlist in the HDD 211 and the remaining discs 501 to 503 are then loaded in FIG. 5, a playlist 505 has already been recorded in the HDD 211. If a playlist is not recorded in the HDD 211 in step S812, the main microcomputer 220 displays a message that prompts the user to load another disc on a display device connected to the video deck (S813), and the process returns to step S801.

Next, the main microcomputer 220 confirms the disc IDs and content numbers registered in this media group based on the playlist recorded in the HDD 211 and the management information of the disc read out in step S802. The main microcomputer 220 discriminates if the registered content is recorded on the currently loaded disc (S805). If the registered content is recorded on the disc, the main microcomputer 220 discriminates if this content has already been recorded in the HDD 211 (S806). If the registered content has not been recorded yet, the main microcomputer 220 reads out the registered content from the disc, and records it in the HDD 211 (S807). If the registered content has already been recorded in the HDD, the process jumps to step S808.

The main microcomputer 220 discriminates if all the contents registered in the playlist have already been recorded in the HDD 211 (S808). If the DVD 504 that records the playlist 505 is loaded for the first time, data in the HDD 211 is in a state 506 shown in FIG. 5.

In the state 506 in FIG. 5, not all the contents are acquired.

Figure 6:
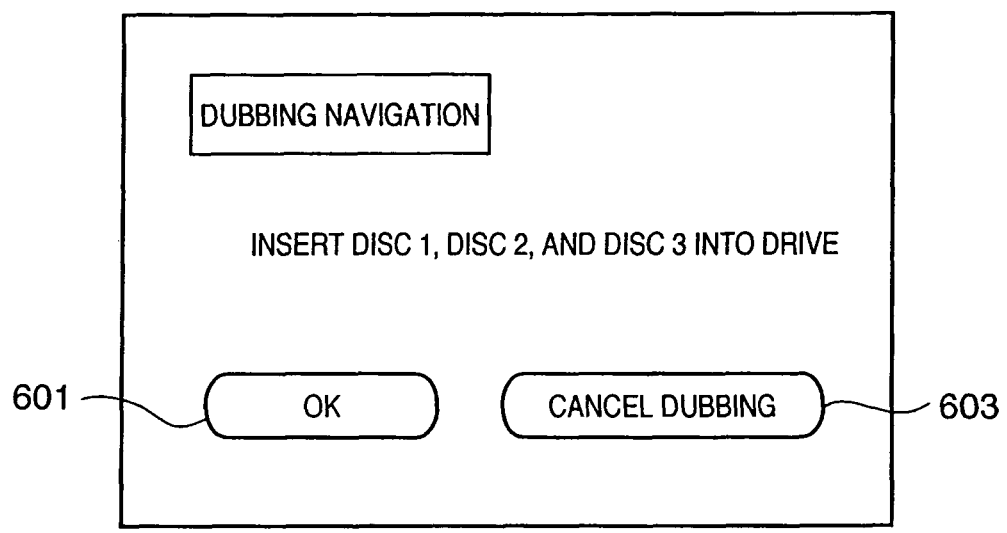
FIG. 6 shows an example of a message displayed on the stationary type video deck according to the embodiment of the present invention.

In this case, the main microcomputer 220 displays a message that prompts the user to load the first to third DVD media 501 to 503 which record the lacking contents to be recorded on the display device connected to the video deck based on the disc IDs registered in the playlist, as shown in FIG. 6 (S814).

If the user exchanges the 8-cm DVD media according to the instruction, dubbing restarts. Reference numeral 507 in FIG. 5 denotes a state in which all the contents are acquired in the HDD 211. The stationary type video deck reads out the playlist file 505 copied into the HDD 211 again, and checks if all the registered contents are recorded in the HDD 211.

Figure 7:
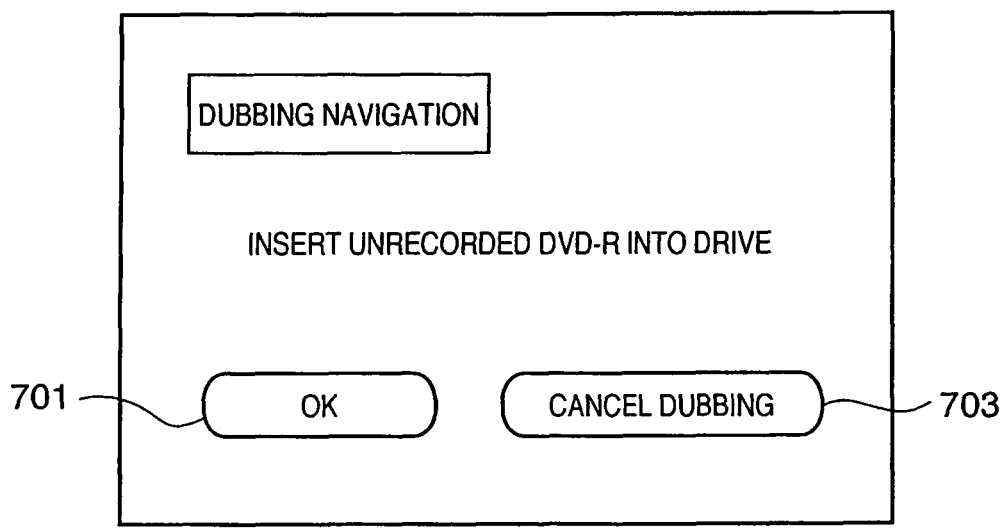
FIG. 7 shows an example of a message displayed on the stationary type video deck according to the embodiment of the present invention.

If it is confirmed in step S808 that all the contents registered in the playlist have already been recorded in the HDD 211, the main microcomputer 220 displays a message that prompts the user to load an unrecorded DVD-R medium into the removable disc drive 212A as a copy destination disc, as shown in FIG. 7 (S809).

If the user loads the unrecorded DVD-R media into the removable disc drive 212A (S810), the main microcomputer 220 sequentially reads out the data of registered contents 1 to 7 in FIG. 5 stored in the HDD 211, and records them in the loaded DVD-R disc (S811). As a result, the DVD-R disc that records the contents as those described in the playlist is created, as denoted by 508 in FIG. 5.

Note that this embodiment assumes recording on a 12-cm medium, generates a playlist so that the total of the capacities of original contents recorded on respective 8-cm DVD media falls within 4.7 Gbytes, and displays the remaining capacity.

However, the present invention may adopt an arrangement that assumes recording on 8.5 Gbytes (12-cm, dual-layer DVD medium), 25 Gbytes (12-cm, Blu-ray disc), and 50 Gbytes (12-cm dual-layer Blu-ray disc) in addition to the 12-cm DVD medium.

In this embodiment, contents to be recorded on one 12-cm DVD medium later are recorded in 8-cm DVD media first. However, the present invention is not limited to this, and contents recorded on other media such as memory cards, and the like may be recorded on a 12-cm DVD medium.

According to this embodiment, the photographing apparatus side such as the digital video camera or the like generates a playlist to have a plurality of contents recorded on a plurality of small-capacity recording media as one group. The stationary type video deck side discriminates if all contents in the group whose playlist is created are acquired, and if data to be recorded still remain, it displays a message that prompts the user to exchange the current medium to the corresponding recording medium.

In this way, the contents on the plurality of small-capacity recording media can be stored in a large-capacity storage medium without any omission of contents or without any time-consuming operations such as an edit operation and the like.

Other Embodiments

The preferred embodiments of the present invention have been explained using their practical examples, and the present invention can be practiced in the forms of a system, apparatus, method, program, storage medium (recording medium), and the like. More specifically, the present invention can be applied to either a system constituted by a plurality of devices, or an apparatus consisting of a single equipment.

The objects of the present invention can be achieved by implementing some of the functional blocks and operations shown in the figures by either hardware circuits or software processing using a computer.

Note that the present invention includes a case wherein the invention is achieved by directly or remotely supplying a program of software that implements the functions of the aforementioned embodiments to a system or apparatus, and reading out and executing the supplied program code by a computer of that system or apparatus. In this case, a computer of the system or the like reads out and executes the program code.

Therefore, the program code itself installed in a computer to implement the functional processing of the present invention using the computer implements the present invention. That is, the present invention includes the computer program itself for implementing the functional processing of the present invention.

In this case, the form of program is not particularly limited, and an object code, a program to be executed by an interpreter, script data to be supplied to an OS, and the like may be used as along as they have the program function.

As a recording medium (storage medium) for supplying the program, for example, a flexible disk, hard disk, optical disk, magneto-optical disk, and the like may be used. In addition, MO, CD-ROM, CD-R, CD-RW, magnetic tape, nonvolatile memory card, ROM, DVD (DVD-ROM, DVD-R), and the like may be used.

As another program supply method, connection can be established to a home page on the Internet using a browser on a client computer, and the computer program itself of the present invention can be downloaded from the home page. Also, the program can be supplied by a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by a computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-352328, filed Dec. 6, 2005, which is hereby incorporated by reference herein in its entirety.

What is claimed is:

1. A recording and reproducing apparatus comprising:
a reproducing unit constructed to reproduce image data from a plurality of first recording media, wherein the reproducing unit reproduces management information from one first recording medium of the plurality of first recording media, wherein said one first recording medium is included in one group of the plurality of first recording media and the management information indicates the plurality of first recording media included in the one group, and wherein the management information reproduced from said one first recording medium indicates another of the first recording media other than said one first recording medium of the one group;
a storage unit constructed to store a plurality of the image data reproduced from the plurality of first recording media by said reproducing unit;
a recording unit constructed to record the plurality of image data stored in the storage unit on a second recording medium that is different from the plurality of first recording media in the one group; and
a control unit constructed to control the recording unit, according to the management information reproduced from said one first recording medium, to read out from the storage unit the image data reproduced from the plurality of first recording media of the one group and to record the image data read from the storage unit on the second recording medium.

2. The apparatus according to claim 1, wherein the second recording medium has a recording capacity larger than each of the plurality of first recording media of the one group.

3. The apparatus according to claim 1, wherein when it is discriminated that only the image data reproduced from a part of the plurality of first recording media of the one group are stored in the storage unit, the control unit displays information that prompts to exchange the first recording medium to another first recording medium which records the plurality of image data in the group other than the image data stored in the storage unit on a display unit.

4. The apparatus according to claim 1, wherein
the control unit specifies the first recording medium, on which the image data other than the image data stored in the storage unit, of the plurality of first recording media of the one group are recorded based on the management information.

5. A data recording method for a recording and reproducing apparatus, wherein the recording and reproducing apparatus comprises:
a reproducing unit constructed to reproduce image data from a plurality of first recording media, wherein the reproducing unit reproduces management information from one first recording medium of the plurality of first recording media, wherein said one first recording medium is included in one group of the plurality of first recording media and the management information indicates the plurality of first recording media included in the one group, and wherein the management information reproduced from said one first recording medium indicates another of the first recording media other than said one first recording medium of the one group; and
a storage unit constructed to store a plurality of the image data reproduced from the plurality of first recording media by said reproducing unit,
the method comprising:
a recording step of using the recording and reproducing apparatus to record the plurality of image data stored in the storage unit on a second recording medium that is different from the plurality of first recording media of the one group; and
a control step of controlling said recording step, according to the management information reproduced from said one first recording medium, to read out from the storage unit the image data reproduced from the plurality of first recording media of the one group and to record the image data read from the storage unit on the second recording medium.

* * * * *